(No Model.)
M. J. CASWELL.
PUMP.
No. 548,697. Patented Oct. 29, 1895.
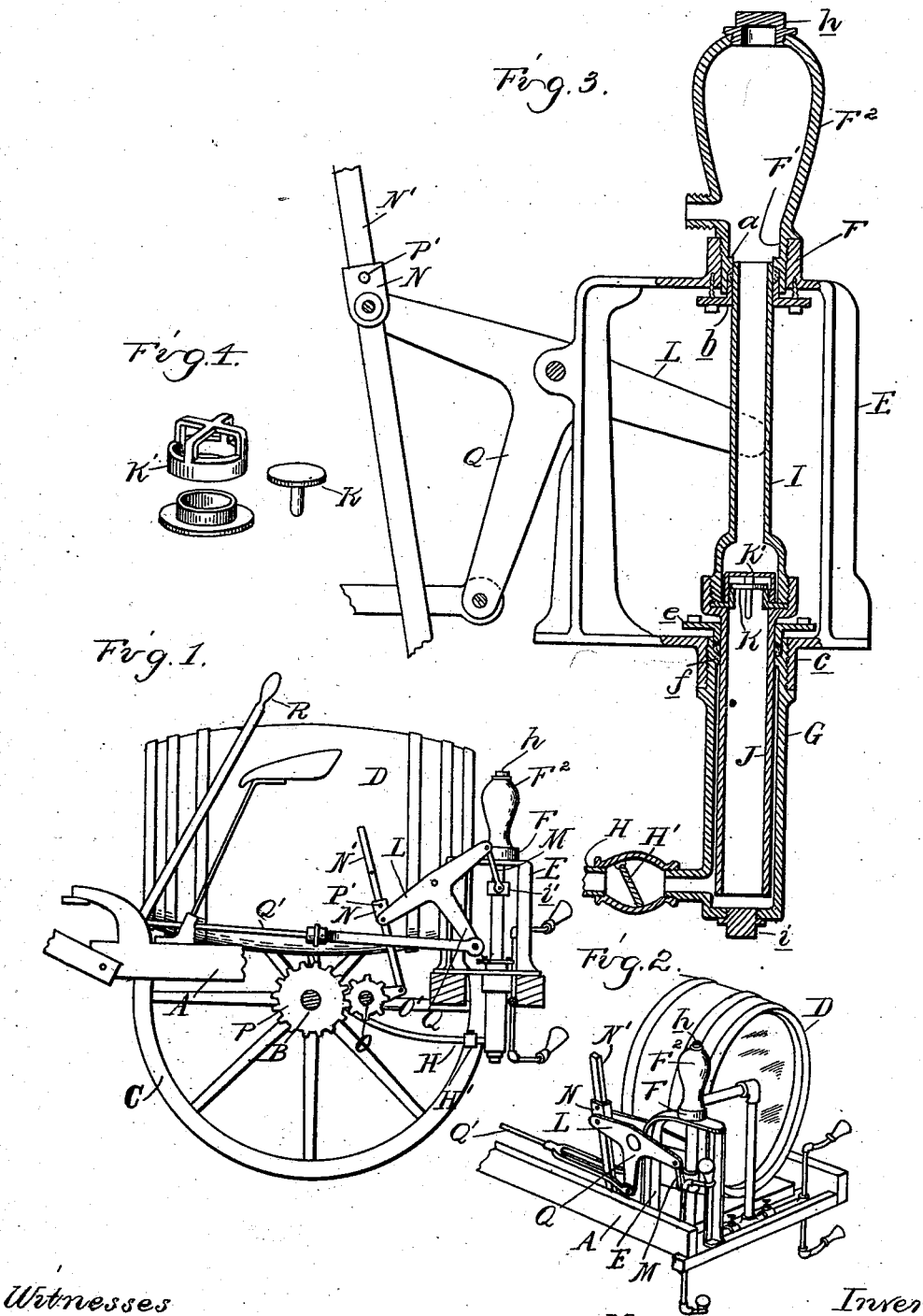
Witnesses
A. L. Nabby
O. F. Barthel
Inventor
Myron J. Caswell
By
Atty's

UNITED STATES PATENT OFFICE.

MYRON J. CASWELL, OF SANDUSKY, OHIO.

PUMP.

SPECIFICATION forming part of Letters Patent No. 548,697, dated October 29, 1895.

Application filed July 31, 1894. Serial No. 519,082. (No model.)

*To all whom it may concern:*

Be it known that I, MYRON J. CASWELL, a citizen of the United States, residing at Sandusky, in the county of Erie and State of Ohio, have invented certain new and useful Improvements in Pumps, of which the following is a specification, reference being had therein to the accompanying drawings.

The invention consists in the peculiar construction of a pump; further, in the peculiar construction of such a pump combined with a tank, with means for actuating it from the wheels of a truck upon which the tank is supported or by hand, and, further, in the peculiar construction, arrangement, and combination of the various parts, all as more fully hereinafter described.

In the drawings, Figure 1 is a side elevation, partly in section, of my improved device. Fig. 2 is a rear perspective view thereof. Fig. 3 is an enlarged vertical central section through the pump. Fig. 4 is a detached perspective view of the valve.

A is the frame of the machine.

B is an axle.

C are the wheels.

D is a tank on the frame.

E is an open frame, preferably rectangular, secured to the frame of the machine and forming the pump-frame. On the top bar of this frame is an aperture, and around the aperture is a tubular flange F, in which is secured the nipple F' of the air-chamber F². At the lower end of this nipple is a stuffing-box, formed by the inwardly-extending annular flange $a$ and the gland $b$, the adjusting-screws of which enter screw-threaded apertures in the frame. In line with the aperture in the top bar is an aperture in the lower bar, around which is the integrally screw-threaded tubular flange $c$, in which is secured the upper end of the cylinder G, in which is formed a stuffing-box between the gland $e$ and flange $f$. At the top of the air-chamber F² is a plug $h$ and at the bottom of the cylinder G is a plug $i$. Near the bottom of the cylinder G is a nipple, to which is connected the suction-pipe H, provided with the usual check-valve H'.

I and J are tubular plungers connected together centrally by screw-threaded flanges, the upper plunger being smaller than the lower plunger, and with a check-valve K between, the frame K' of which is clamped between the meeting ends of the plungers. The upper plunger engages in the nipple of the air-chamber and the lower plunger engages in the cylinder G. The plungers are reciprocated by means of a double walking-beam or lever L, pivoted on one leg or standard of the pump-frame and extending on both sides thereof, being connected by the links M with trunnions $i'$ centrally of the plungers. This walking-beam may be rocked either by connection with the ground-wheels or by hand-power, and the devices for accomplishing this I have shown as of the following description.

N is a sleeve pivoted at the forward end of the walking-beam, and N' is a connecting-rod passing through the sleeve and connected to a crank on the stub-shaft O, secured on the frame beside the axle. O' is a pinion on this shaft, meshing with the gear-wheel P on the axle.

P' is a pin for connecting the sleeve N to the connecting-rod N'. When the cart is under motion and the pin P' in position through the sleeve and connecting-rod, the walking-beam will be rocked through the connections described.

Centrally of the walking-beam is a depending arm Q, to the lower end of which is connected the rod Q', which is connected to the hand-lever R, arranged in proximity to the seat of the driver.

The pin P' being removed, it is evident that the pump may be operated by the driver.

The discharge of the pump I have connected to suitable spraying-nozzles.

The upward reciprocation of the plungers forces the material out of the air-chamber by the displacement caused by the upper plunger entering therein, at the same time drawing fluid into the cylinder G. As the plunger descends, the fluid in cylinder G will be forced out into the upper plunger, which is much smaller (about half the size) than the lower plunger, and consequently half of the volume of the lower plunger will be forced out, thus making a double-acting pump of it. The only valve which needs attention is that between the two plungers, and that can be reached by simply unscrewing the two plungers at their meeting point, and replaced or repaired without displacing any other parts.

Thus I get with a single valve a double-acting pump simple in construction, easily repaired, and one in which I dispense with pistons and their packing, which will not last in pumping the usual poisonous spraying compounds.

What I claim as my invention is—

1. The combination with the wheeled frame, the tank thereon, the pump, the walking beam connected with the pump, the connecting rod adjustably secured to the walking beam, the pinion gear wheel on the axle, the crank connection from the connecting rod to the pinion, the arm Q on the walking beam, the lever arranged in proximity to the driver's seat and the connecting rod between the lever and arm Q of the walking beam, substantially as described.

2. In a pump, the combination of the open frame, the top and bottom bars apertured in line, screw threaded flanges around the apertures, an air chamber engaging in the flange in the upper bar, a cylinder engaging in the flange of the lower bar, stuffing boxes in the contiguous ends of the chamber and cylinder, a plunger consisting of upper and lower tubular sections of different capacity, screw threaded together at their meeting ends, and a valve at the junction of the sections, substantially as described.

3. The combination of the wheeled frame, the tank thereon, the pump, the walking beam L connected to the pump, the sleeve N pivoted to the other end of the walking beam, the connecting rod N' slidingly engaged with said sleeve, the detachable pin P', the pinion O', the gear wheel P on the drive axle, the crank connection from the pinion O' to the connecting rod N', the arm Q on the walking beam, the connecting rod Q' and the lever R arranged in proximity to the driver's seat to which the connecting rod Q' is attached, the parts arranged and combined substantially as and for the purpose described.

In testimony whereof I affix my signature in presence of two witnesses.

MYRON J. CASWELL.

Witnesses:
JAMES WHITTEMORE,
M. B. O'DOGHERTY.